US005541421A

United States Patent [19]
Brandt et al.

[11] Patent Number: 5,541,421
[45] Date of Patent: Jul. 30, 1996

[54] LIGHT COLLECTOR HAVING OPTICALLY COATED ACRYLIC SUBSTRATE

[75] Inventors: Michael B. Brandt, Walworth; Michael R. Flynn, Rochester, both of N.Y.

[73] Assignee: Eastman Kodak Company, Rochester, N.Y.

[21] Appl. No.: 342,569

[22] Filed: Nov. 21, 1994

[51] Int. Cl.⁶ ............................. H01J 47/26; G01T 1/20; G03B 42/02
[52] U.S. Cl. .................. 250/586; 250/227.18; 250/368; 358/494
[58] Field of Search ..................... 250/585, 586, 250/578.1, 227.18; 358/484, 494, 496, 470, 487

[56] References Cited

U.S. PATENT DOCUMENTS

| | | |
|---|---|---|
| 3,663,083 | 5/1972 | Friedman et al. . |
| 3,800,058 | 3/1974 | Bartok et al. ............................ 84/1.18 |
| 4,068,121 | 1/1978 | Bringhurst et al. ..................... 250/227 |
| 4,101,365 | 7/1978 | Fisli ........................................ 156/294 |
| 4,259,370 | 3/1981 | Fisli ........................................ 427/162 |
| 4,346,295 | 8/1982 | Tanaka et al. . |
| 4,541,415 | 9/1985 | Mori ....................................... 126/440 |
| 4,564,286 | 1/1986 | Maiorano ................................ 355/11 |
| 4,591,714 | 5/1986 | Goto et al. . |
| 4,591,715 | 5/1986 | Goto . |
| 4,666,263 | 5/1987 | Petcavich .............................. 350/640 |
| 4,720,426 | 1/1988 | Englert et al. ....................... 250/361 R |
| 4,736,102 | 4/1988 | Morrone . |
| 4,742,225 | 5/1988 | Chan . |
| 4,743,758 | 5/1988 | Chan et al. . |
| 4,743,759 | 5/1988 | Boutet . |
| 4,775,791 | 10/1988 | Owen et al. . |
| 4,842,824 | 6/1989 | Ono ........................................ 428/64 |
| 4,849,632 | 7/1989 | Watanabe . |
| 4,970,394 | 11/1990 | Boutet et al. ....................... 250/327.2 |
| 5,039,854 | 8/1991 | Yip et al. ........................... 250/227.18 |
| 5,105,079 | 4/1992 | Boutet et al. ......................... 250/228 |
| 5,134,290 | 7/1992 | Boutet et al. . |
| 5,140,160 | 8/1992 | Boutet et al. . |
| 5,404,024 | 4/1995 | Namki ................................... 250/586 |

OTHER PUBLICATIONS

H. Cotton, Principles of Illumination, John Wiley, New York, 1960, p. 157.
P. Moon, The Scientific Basis of Illuminating Engineering, 2nd Edition, Dover, New York, 1961, p. 267.

Primary Examiner—Constantine Hannaher
Assistant Examiner—Virgil O. Tyler
Attorney, Agent, or Firm—William F. Noval

[57] ABSTRACT

Apparatus for collecting and detecting radiation emitted by, reflected from, or transmitted through a scanned information medium. The apparatus includes a photodetector assembly and first and second planar mirror assemblies configured to maximize collection efficiency and flare radiation attenuation. The first and second planar mirror assemblies include specularly reflective mirrors including an acrylic substrate having a reflective aluminum coating vacuum deposited on the acrylic substrate.

7 Claims, 8 Drawing Sheets

LIGHT COLLECTOR HAVING OPTICALLY COATED ACRYLIC SUBSTRATE

FIELD OF THE INVENTION

This invention relates to an apparatus for reading the image stored in a photostimulable storage phosphor. More particularly, this invention relates to an apparatus for collecting and detecting the radiation emitted from a photostimulable storage phosphor during scanning by stimulating radiation. This apparatus can also be utilized in image acquisition systems in which the image bearing media is either diffusely reflective or diffusely transparent.

BACKGROUND OF THE INVENTION

Specularly reflective collectors which have been designed to date have not been well optimized in terms of both energy collection efficiency and control of flare radiation. This is due partially to the fact that there are no commercially available computer programs capable of optimizing such designs. The designer must rely on conceptual designs that can only be analyzed on a computer. In addition, there has not been a strong emphasis placed on maximizing collection efficiency, rather; much of the past effort would appear to have been directed toward minimizing flare radiation. Flare radiation is defined as that portion of the stimulating radiation, reflected or scattered by the storage phosphor, which enters the collector and propagates along a path, such that it exits the collector and strikes the storage phosphor at a position which does not coincide with the position of the scanning beam. This errant radiation will stimulate blue photon emissions from this other location and thereby corrupt the signal which is being detected synchronously with the position of the scanning beam, as well as the signal which will be detected from this other location if it has not yet been scanned. The net effect of flare radiation is to corrupt the fidelity of the latent image by reducing the overall dynamic range, and in particular, the contrast ratios in regions of low exposure.

Figure 1:
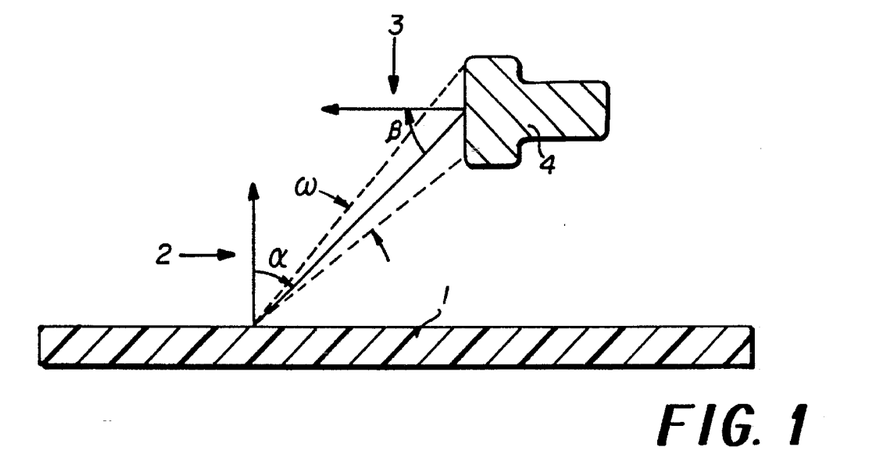
FIG. 1 is a diagram of a generic collector's cross-sectional geometric relationships.

When considering specularly reflective collector designs, the designer should be aware of a few important guidelines. First, the number of reflections required to reach the detector must be minimized in order to achieve high collection efficiency. For example, an aluminum reflector will absorb 8% of the incident 390 nm emission with each reflection. Second, referring to FIG. 1, the declination angle, $\alpha$, of the detector 4, with respect to the surface normal 2 of the storage phosphor 1, should be minimized. Given that the emissions are Lambertian in nature, the radiated energy which strikes the detector directly, without undergoing any reflection, is proportional to the cosine of this declination angle (i.e., the projected area of the source). Third, the cross sectional angle, $\omega$, subtended by the detector 4 should be kept as large as possible to maximize collection of the radiated energy which can strike the detector directly. This can be achieved by keeping $\beta$, the angle that the detector's mirror 3 makes with respect to the line of sight, as close to zero as possible, thus maximizing the projected area of the detector as viewed from the phosphor. In addition, the cross sectional angle, $\omega$, can be increased by minimizing the distance between the detector and the phosphor. Fourth, the detector may reflect a large portion of the incident energy, hence, the collector should be designed to return as much of this energy as possible back to the detector, with a minimal number of reflections. In the case of a photomultiplier tube with a $K_2CsSb$ photocathode, the blue radiation reflectivity has been shown to be approximately 22%. And lastly, the design must prevent or minimize flare radiation.

U.S. Pat. No. 4,742,225 discloses a reflective collector design with elliptical cross section possessing very good collection efficiency. In this design, the detector's declination angle is approximately 20 degrees, and the cross sectional angular subtense of the detector is approximately 26 degrees. A closed form solution of the flux incident on an array of detectors at this location and orientation shows that approximately 20% of the emitted radiation will strike the detector array directly. In addition, the emitted radiation which fails to strike the detector directly, will strike it after a single reflection. The design has the following disadvantages. First, fabrication of the elliptical reflector can be difficult or costly. Second, no attempt has been made to recycle the energy reflected by the detector; rather the back side of the entrance aperture is made into an absorber to minimize flare radiation. If this mirror were made of a specularly reflective material, the bulk of the energy reflected by the detector would require 2 to 3 reflections to reach the detector again. Third, flare radiation is not as well controlled as in other collector designs. (See the following U.S. patents which disclose systems having these, as well as other disadvantages: U.S. Pat. Nos. 3,663,083, issued May 16, 1972, inventors Friedman et al; 4,346,295, issued Aug. 24, 1982, inventors Tanaka et al; 4,736,102, issued Apr. 5, 1988, inventor Morrone; 4,775,791, issued Oct. 4, 1988, inventors Owen et al.)

U.S. Pat. No. 4,743,758 discloses three specularly reflective box designs. In these designs, the detector's declination angle varies from 49 to 53 degrees. In addition, the detector is located at such a distance from the phosphor that it subtends a small cross sectional angle of only 11 to 16 degrees. At such a location, much of the emitted radiation must undergo numerous reflections in order to reach the detector. A closed form solution of the flux incident on an array of detectors at this location and orientation shows that approximately 7% of the emitted radiation will strike the detectors directly. The chief advantages of the reflective box designs are that flare radiation is well controlled, and the mirrors are relatively inexpensive to manufacture. The chief drawback of these designs is a lower collection efficiency due to: the small angular subtense of the detector, the number of reflections required to reach the detector, and the inability to recycle the reflected energy.

U.S. Pat. Nos. 4,743,759, 5,105,079, 5,134,290, and 5,140,160 disclose various designs regarding the use of tapered roof mirrors to direct the stimulated emissions towards the detector as well as to direct the scattered stimulating radiation away from the phosphor. These designs employ a very large diameter detector to increase the angular subtense of the detector and to increase the angle of the taper. However, the location and orientation of the detector with regard to the position of the stimulated emissions force these designs to rely heavily upon multiple reflections. Collection efficiency suffers because many of the parameters affecting the angular subtense of the detector become self defeating in these designs. For instance, the detector's declination angle, $\alpha$, is approaching zero degrees just as the angle that the detector's mirror normal makes with respect to the line of sight, $\beta$, is approaching 90 degrees, and vice versa. Likewise, the distance between the detector and the emission source decreases as the angle that the detector's mirror normal makes with respect to the line of sight, $\beta$, is increasing. In addition, the vertically oriented mirror essentially doubles the size of the upper entrance aperture, thereby allowing twice as much energy to escape from the collector. This results in a great reduction of collection efficiency near the far ends of the collector where this aperture is closest to the phosphor. The chief advantages of the roof mirror configurations are the low cost associated with utilization of a single detector and plane reflectors. In addition, flare radiation is extremely small.

U.S. Pat. No. 4,849,632, issued Jul. 18, 1989, inventor Watanabe; U.S. Pat. Nos. 4,591,714, issued May 27, 1986, inventors Goto et al; and 4,591,715, issued May 27, 1986, inventor Goto disclose stimulable phosphor imaging systems in which emitted light is collected by a solid transparent light guide assembly and detected by multiple photomultiplier tubes. The light guides disclosed in these patents are expensive, difficult to manufacture and rely on multiple light reflections to the PMTs, thus reducing light collection efficiency.

Radiation collection efficiency is also a function of the material or substrate which is utilized to construct the reflective surfaces which reflect the radiation to the photodetector. That is, once the collector light path geometry is optimized (in other words, how the light rays bounce, or travel from the initial collection aperture to the photodetector), it is the specular reflectivity that determines the efficiency of the light collector system.

The higher the reflectivity of the light collector, the better the light collection at the PMT. More specifically, the specular collection efficiency of the mirrors wants to be high and the diffuse reflection low. In addition to performance, manufacturability and cost are very important.

Potential collector substrate/mirror options include:

| | |
|---|---|
| Aluminized estar on rigid support | difficult to manufacture |
| Aluminum-machined and buffed | expensive, high diffuse reflectivity |
| Aluminum-diamond turned | expensive |
| Commercially available first surface mirror, glass and plastic | low specular reflectivity |
| Vacuum metallized (Luster-Coate) substrate | low specular reflectivity |
| Optically coated acrylic substrate | higher diffuse reflectance than optically polished and coated glass |

As exemplified in the following patents, although acrylic has been used in a variety of optical applications, it has not been utilized to produce a radiation collector, for phosphor emissions, which requires very high specular reflectivity and low diffuse reflectivity.

U.S. Pat. Nos. 4,259,370, issued Mar. 31, 1981, inventor Fisli; 4,101,365, issued Jul. 18, 1978, inventor Fisli; 4,564,286, issued Jan. 14, 1986, inventor Maiorano; 3,800,058, issued Mar. 26, 1974, inventors Bartok et al.; 4,541,415, issued Sep. 17, 1985, inventor Mori; 4,068,121, issued Jan. 10, 1978, inventors Bringhurst et al.; 4,842,824, issued Jun. 27, 1989, inventor Ono.

There is thus a problem in the prior art of providing a light collector in stimulable phosphor imaging systems which has high light collection efficiency and flare radiation attenuation and low diffuse reflection.

SUMMARY OF INVENTION

According to the present invention, there is provided a specularly reflective collector which solves the problems of the prior art and in which the collection efficiency and flare radiation attenuation exceeds those performance characteristics of the prior art and in which diffuse reflectivity is minimized.

According to an aspect of the present invention, there is provided a collector for collecting and detecting radiation emitted by, reflected from, or transmitted through a scanned information medium comprising a photodetector assembly with first and second sides which extends the width of a scanned information medium and which has a detection surface substantially parallel to or perpendicular to said information medium; a first planar mirror assembly which extends parallel to said photodetector assembly, which has a lower edge located adjacent to said information medium and an upper region adjacent to said first side of said detection surface of said photodetector assembly; a second planar mirror assembly which extends parallel to said photodetector assembly, which has a lower edge located adjacent to said information medium and an upper region adjacent to said second side of said detection surface of said photodetector assembly; wherein said lower edges of said first and said second planar mirror assemblies are spaced apart and form an aperture for passing radiation emitted by, reflected from, or transmitted through an information medium; wherein said photodetector assembly, said first planar mirror assembly and said second planar mirror assembly are configured (1) so that substantially all radiation passing through said aperture strikes said photodetector assembly either directly or after a single reflection from said first planar mirror assembly; (2) so that said first planar mirror assembly reflects incident radiation only once before it strikes said photodetector assembly; and so that said second planar mirror assembly reflects radiation reflected by said photodetector assembly with only a single reflection back to said photodetector assembly; and wherein said first and second planar mirror assemblies include specularly reflective mirrors including an acrylic substrate having a reflective aluminum coating which is vacuum deposited on said acrylic substrate.

DETAILED DESCRIPTION OF THE PREFERRED EMBODIMENTS

Figure 2:
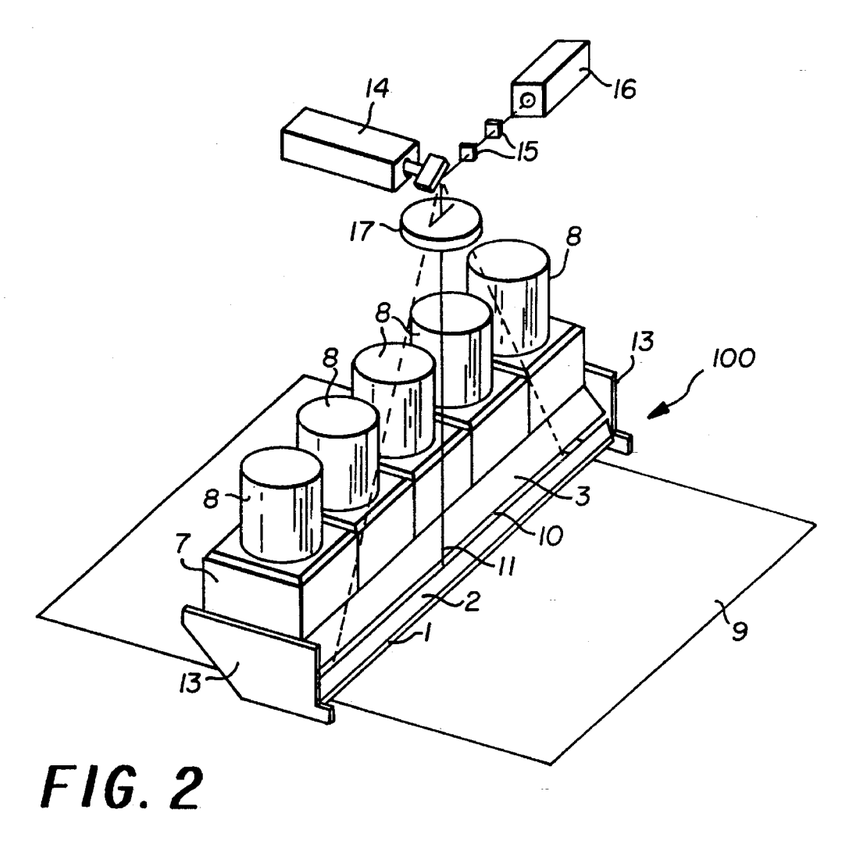
FIG. 2 is a perspective view of a storage phosphor scanner including a collector according to the present invention.

FIG. 2 illustrates the basic components of a storage phosphor scanner. Stimulation radiation is provided by a laser source 16. The laser beam is shaped by beam shaping optics 15 and is then caused to raster scan by reflection from a galvanometer 14 or other suitable scanning mechanism.

The beam then passes through an F-theta lens 17 to linearize beam position on the storage phosphor 9 with the angular position of the scan mirror. The scanning laser beam 11 then passes into the collector 100 through a first slit aperture 10 which lies between specularly reflective mirrors 2 and 3, and immediately exits the collector 100 through a second slit aperture 12 (FIG. 3) at the bottom of the collector 100. Upon exiting the second aperture 12 in the collector 100, the beam is brought to a focus on the storage phosphor 9 creating both stimulated emissions from a very small pixel area on the storage phosphor 9 and a large amount of scattered stimulating radiation. The laser beam scans the width of storage phosphor 9 as it is moved in a direction perpendicular to the scanning direction. Thus, storage phosphor 9 is scanned in a raster pattern.

Approximately 89%, of the stimulated radiation which is released in proportion to the number of x-ray absorptions at that particular photo site and the intense scattered stimulating radiation, enter the collector 100 through second slit aperture 12. A small portion, approximately 5% of this stimulated radiation escapes out of the collector through first slit aperture 10.

The remainder of the stimulated radiation is directed onto the stimulating radiation absorption filter 7 and the five photomultiplier tubes (PMT) 8 either directly, or indirectly through reflection from mirrors 1, 2, or 3. A small percentage of the stimulating radiation is reflected by the front mirror of the stimulating radiation absorption filter 7. A much larger percentage of the stimulated radiation is reflected by the PMTs 8. These reflected radiations are returned back to the stimulating radiation absorption filter 7 and the PMTs 8 by a single reflection from mirrors 5 or 6. By recycling these radiations one more time with a single reflection, collection efficiency is very nearly maximized and flare radiation is essentially removed from the system. The detected signal and the position of the scanning beam are recorded to produce a digital representation of the latent x-ray image recorded by the storage phosphor.

The PMTs 8, as an example, are comprised of five 3 by 3 inch square photomultiplier tubes 8 (Reference FIGS. 2 and 3) of the Burle C83079E or Hamamatsu R4445 models. The height of the photocathode of PMT 8 is located approximately 2 inches above the storage phosphor 9, and is displaced laterally from the scanning laser beam 11 by approximately 2.125 inches for mechanical clearance. The height of the photocathode of PMT 8 was optimized to maximize the collection of stimulated emissions that can strike the PMT 8 directly, at such a lateral displacement.

According to the invention, mirrors 1, 2, 3, 5, and 6 (and 4, if appropriate), as well as end mirrors 13, include an acrylic substrate which are vacuum coated with a reflective metal such as aluminum. Because the substrate surface smoothness determines resultant reflectivity, the substrate can be Atohaas (formerly Rohm & Haas) #2025 MC Plexiglas, 0.236" thick or equivalent. (Other acrylic and polycarbonate materials are potential substrate candidates. The scope of this disclosure is not limited to Atohaas #2025 MC Plexiglas. Material thickness, color can also vary.) This material is melt calendered for better surface finish tolerance, and is black opaque for anti-light piping.

The reflective coating is a vacuum deposition process. The coating consists of:

chromium adhesion layer=500 angstroms aluminum layer=900–1550 angstroms silicon dioxide layer=¼ wave optical thickness titanium dioxide layer=¼ wave optical thickness Coated samples were environmentally chambered (temperature, R.H.) to expected operating conditions for cursory assessment of mirror degradation (i.e., oxidation, discoloration, peel, etc.) with practically no effect.

Lastly, the plurality of mirrored substrate are mechanically joined to form collector 100. Filters and photodetectors, etc., are then assembled.

The following Table 1 lists the reflectance of several collector substrate materials. The enhanced aluminum coated acrylic substrate, according to the present invention, advantageously has a higher spectral reflectance/low diffuse reflectance combination than any of the other substrates.

TABLE 1

Reflectance of Collector Substrate Materials

| | | |
|---|---|---|
| Aluminized Estar | Spectral: | 91–92% @ 400 |
| | Diffuse: | NA |
| Aluminum 6061 - machined and buffed | Spectral: | 73–75% |
| | Diffuse: | 13–15% |
| Aluminum 6061 - diamond turned | Spectral: | 89% |
| | Diffuse: | 5% |
| Commercially available first surface mirror | Spectral: | 66.2% |
| | Diffuse: | 5.4% |
| Vacuum metallized | Spectral: | 52.6% |
| | Diffuse: | 1.25% |
| Optically coated acrylic Atohaas #2065 MC Plexiglass | Spectral: | 96.2% |
| | Diffuse: | 0.10% |

Note:
All values as measured at 400 nm from controlled sampling

Figure 15:
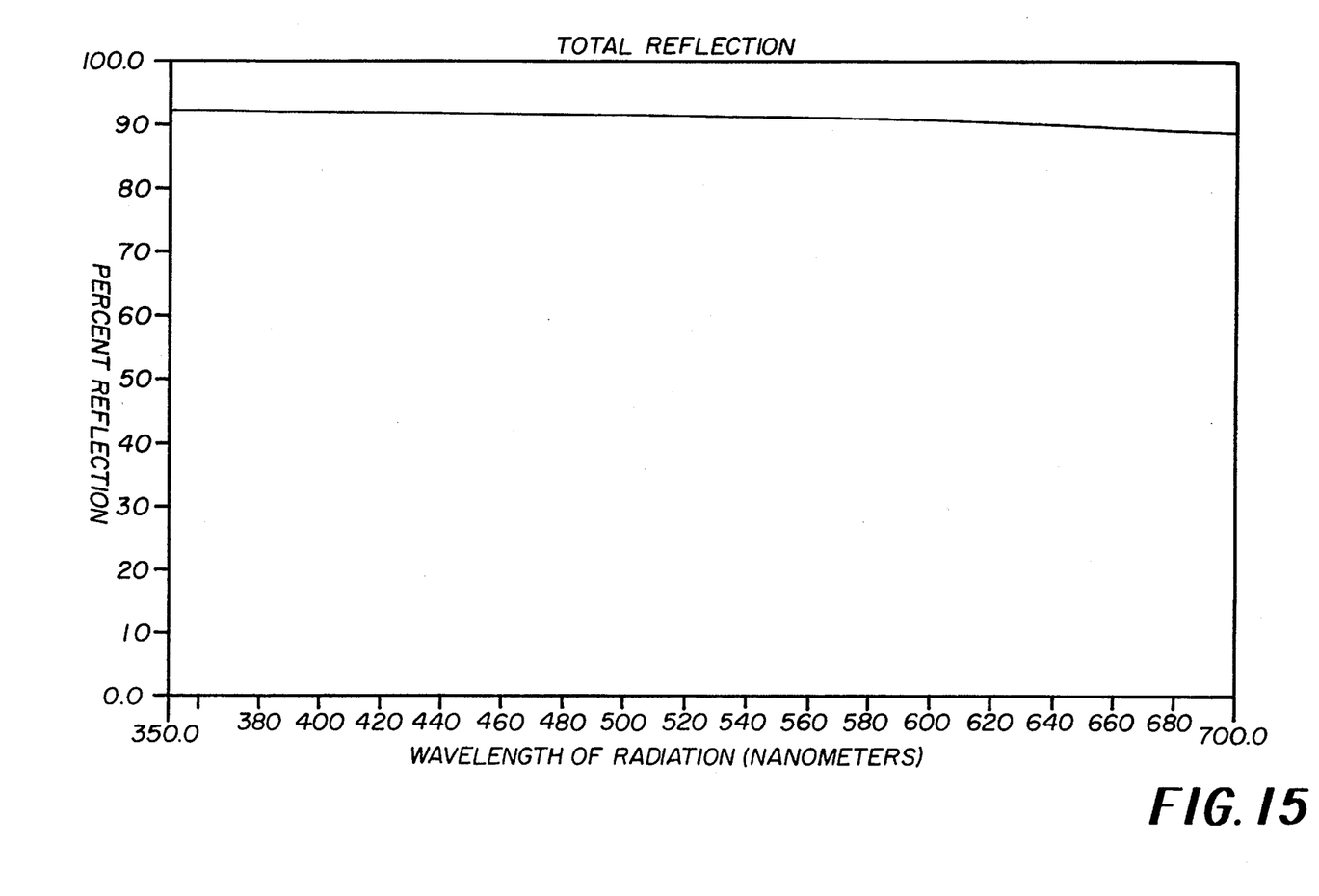
FIG. 15 is a graphical illustration useful in explaining the present invention.

FIG. 15 is a graph of the percent specular reflectance vs. wavelength of radiation, at 0 and 45 degrees incidence, for two samples of the invention described above. The following Tables 2–3 are averages of this sample test data. The diffuse reflectance was measured to be less than 0.1 percent.

TABLE 2

(FIG. 15)
SPECULAR REFLECTION @ 0°

| Wavelength (NM) | Reflection (%) |
|---|---|
| 700 | 86.4 |
| 650 | 89.5 |
| 600 | 92.5 |
| 550 | 94.2 |
| 500 | 95.4 |
| 450 | 95.6 |
| 400 | 96.0 |
| 390 | 96.2 |
| 380 | 95.8 |
| 370 | 95.2 |
| 360 | 93.6 |
| 350 | 88.3 |

TABLE 3

(FIG. 15)
SPECULAR REFLECTION @ 45°

| Wavelength (NM) | Reflection (%) |
|---|---|
| 700 | 94.9 |
| 650 | 87.7 |
| 600 | 90.9 |
| 550 | 93.2 |
| 500 | 94.8 |
| 450 | 95.9 |
| 400 | 96.0 |
| 390 | 96.0 |
| 380 | 95.9 |

TABLE 3-continued (FIG. 15)
SPECULAR REFLECTION @ 45°

| Wavelength (NM) | Reflection (%) |
|---|---|
| 370 | 95.4 |
| 360 | 94.3 |
| 350 | 90.7 |

Figure 3:
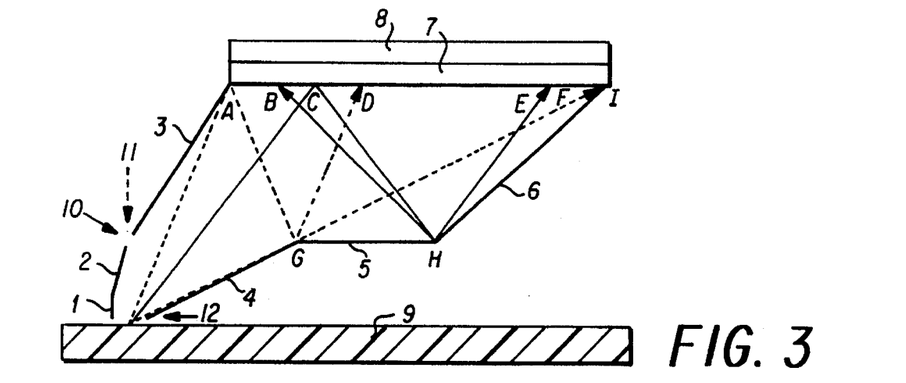
FIGS. 3–7 are diagrammatic cross-sectional views of the collector of FIG. 1 which are useful in explaining the present invention.

FIG. 3 details the direct ray paths that emissions follow to the PMT 8. For the stimulated radiation that strikes the detector between points "A" and "C", the portion that is reflected by the detector will strike mirror 5 between points "G" and "H", reflect, and strike the PMT 8 again between points "D" and "E". For the stimulated radiation that strikes the PMT 8 between points "C" and "F", the portion that is reflected by the PMT 8 will strike mirror 6 between points "H" and "I", reflect, and strike the PMT 8 again between points "B" and "F".

Figure 4:
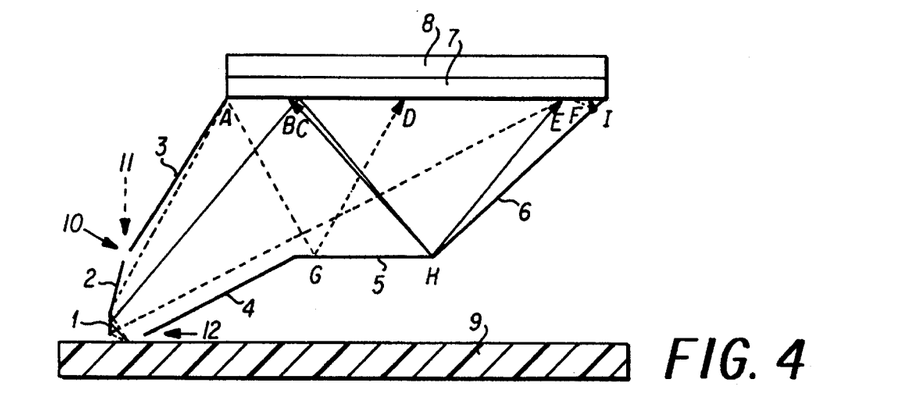

FIG. 4 details the limiting indirect ray paths that emissions follow from a single reflection at mirror 1 to the PMT 8. For the stimulated radiation that strikes the PMT 8 between points "A" and "C", the portion that is reflected by the PMT 8 will strike reflective mirror 5 between points "G" and "H", reflect, and strike the PMT 8 again between points "D" and "E". For the stimulated radiation that strikes the PMT 8 between points "C" and "E", the portion that is reflected by the PMT 8 will strike reflective mirror 6 between points "H" and "I", reflect, and strike the PMT 8 again between points "B" and "F".

Figure 5:
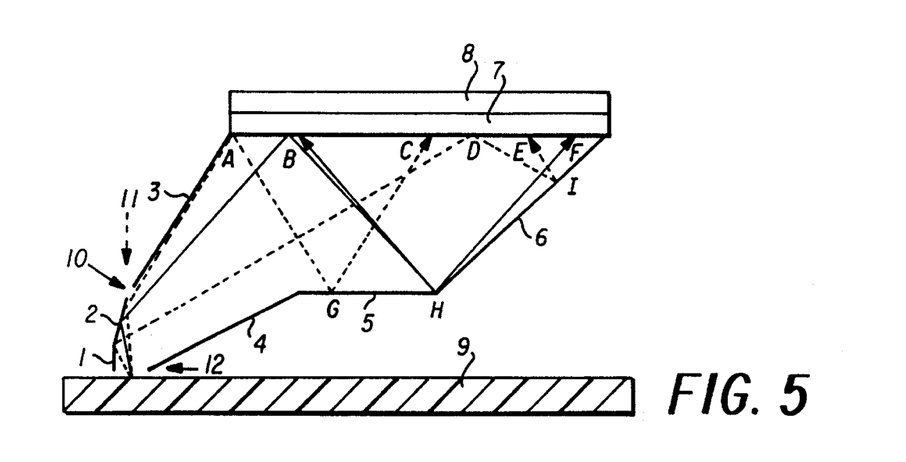

FIG. 5 details the limiting indirect ray paths that emissions follow from a single reflection at mirror 2 to the PMT 8. For the stimulated radiation that strikes the PMT 8 between points "A" and "B", the portion that is reflected by the PMT 8 will strike reflective mirror 5 between points "G" and "H", reflect, and strike the PMT 8 again between points "C" and "F". For the stimulated radiation that strikes the PMT 8 between points "B" and "D", the portion that is reflected by the PMT 8 will strike mirror 6 between points "H" and "I", reflect, and strike the PMT 8 again between points "B" and "E".

Figure 6:
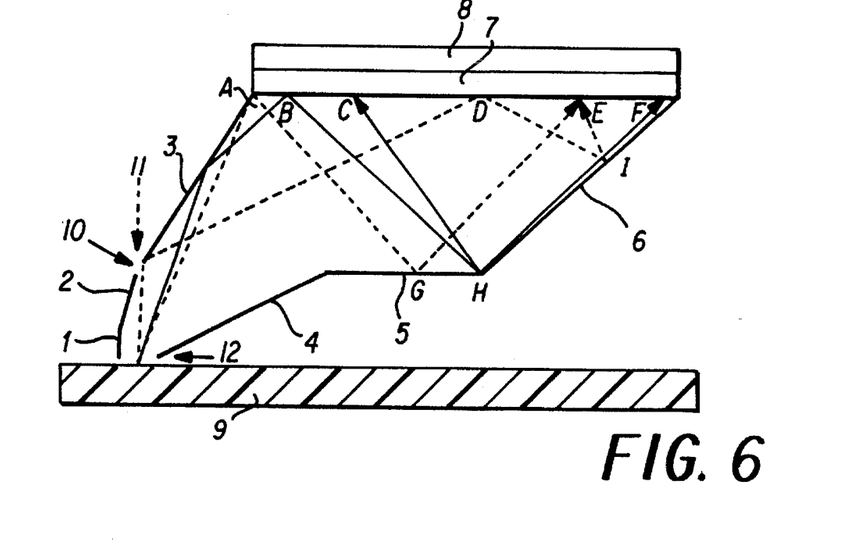

FIG. 6 details the limiting indirect ray paths that emissions follow from a single reflection at mirror 3 to the PMT 8. For the stimulated radiation that strikes the PMT 8 between points "A" and "B", the portion that is reflected by the PMT 8 will strike mirror 5 between points "G" and "H", reflect, and strike the PMT 8 again between points "E" and "F". For the stimulated radiation that strikes the PMT 8 between points "B" and "D", the portion that is reflected by the PMT 8 will strike mirror 6 between points "H" and "I", reflect, and strike the PMT 8 again between points "C" and "E".

No radiation reflects from member 4 (which may or may not be a mirror). The slit aperture 12 could be increased to allow more stimulated emissions to enter the collector 100 by shortening the cross sectional length of member 4 and increasing the angle of inclination that it makes with the storage phosphor 9. In addition, the member 4 would have to be made reflective. The additional gain in performance though would be rather marginal—at a maximum, collection efficiency could be increased from 77% to approximately 81%.

Figure 7:
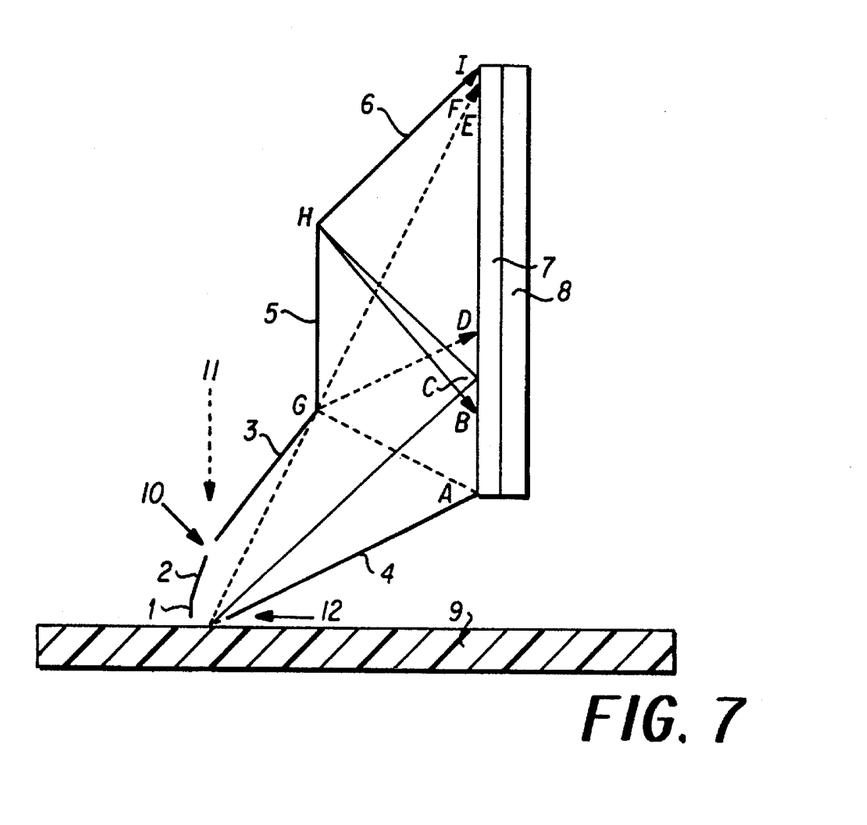

As shown in FIG. 7, for situations in which mechanical space constraints may not allow the PMT 8 array to be oriented vertically, this collector configuration can essentially be flipped about a 45 degree diagonal to create a collector 100 with a horizontally mounted PMT 8 array that has properties identical to those possessed by the previously described collector 100, but with only a very slight loss in collection efficiency due to a minuscule reduction in stimulated emissions which can strike the detector directly (23% vs. 26% previously), and a corresponding increase in stimulated emissions that must reflect once off mirrors 1, 2, or 3 prior to reaching the PMT 8. FIG. 7 details the direct ray paths that emissions follow to the PMT 8. For the stimulated radiation that strikes the PMT 8 between points "A" and "C", the portion that is reflected by the PMT 8 will strike mirror 5 between points "G" and "H", reflect, and strike the PMT 8 again between points "D" and "F". For the stimulated radiation that strikes the PMT 8 between points "C" and "E", the portion that is reflected by the PMT 8 will strike mirror 6 between points "H" and "I", reflect, and strike the PMT 8 again between points "B" and "F".

Similar diagrams as above can be shown which illustrate the limiting indirect ray paths to the PMT 8, reflecting from the PMT 8, and being directed back to it with a single reflection from mirror 5 or 6, for the three scenarios of initial reflection from mirrors 1, 2, or 3.

COLLECTOR PERFORMANCE

Figure 8:
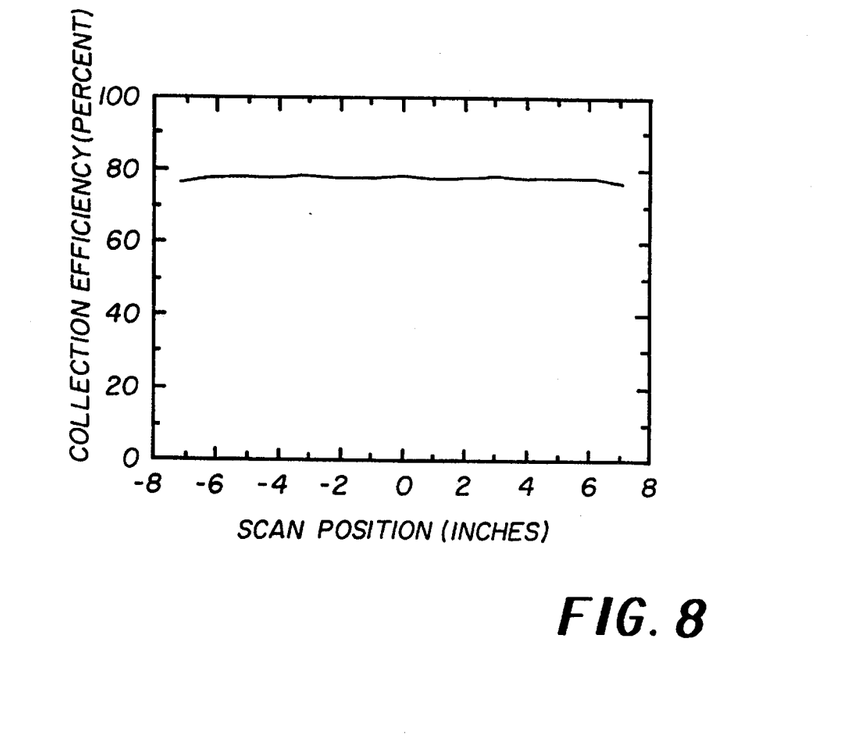
FIG. 8 is a graphical view of collector efficiency as a function of laser beam scan position for the collector of FIG. 2.
Figure 9:
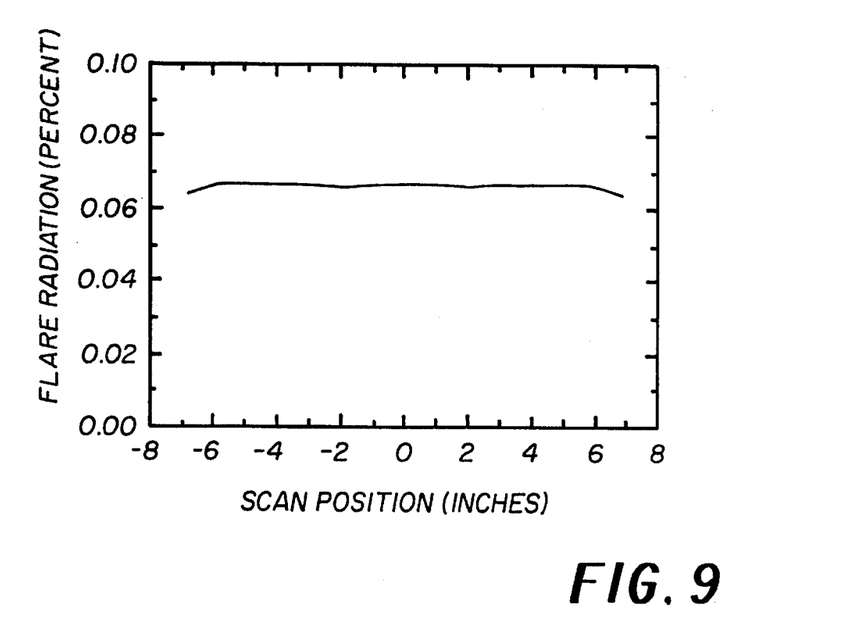
FIG. 9 is a graphical view of flare energy as a function of laser beam scan position for the collector of FIG. 2.

FIG. 8 is a plot of the collection efficiency for this particular collector 100. This analysis assumes that the collector's reflective mirrors of mirrors 1, 2, 3, 5, and 6 are 92% reflective (8% absorptive) and the PMT 8 surface was 22% reflective (78% absorptive). FIG. 9 is a plot of the flare radiation for this particular collector 100. This analysis assumes that the collector's 100 reflective mirrors are 92% reflective (8% absorptive) and the PMT 8 surface was 4% reflective (96% absorptive). The reflectance of the PMT 8 is less in this case because the stimulating radiation absorption filter 7 essentially attenuates all stimulating radiation not reflected by the first surface of this filter 7.

COLLECTOR DESIGN PHILOSOPHY OF AN EXAMPLE

For an example, the minimum cross section width of the surface of the PMT 8 is 2.75 inches. Mechanical constraints relating to the storage phosphor reader in which this collector 100 is utilized require the center of the PMT 8 to be located no closer than 2 inches to the scan beam, and it's surface oriented nearly parallel to the surface of the phosphor 9. The PMT 8 surface therefore becomes a 3 by 15 inch rectangular aperture, located 2 inches off center relative to the emission point. The height of the detector's surface, approximately 2 inches, was optimized with regard to maximizing the detection of directly collected emissions.

The portion of the power emitted from a small Lambertian source that is collected by a rectangular aperture centered over the source is given by $$\frac{2}{\pi} \left( \frac{l}{\sqrt{l^2 + h^2}} \sin^{-1}\left( \frac{w}{\sqrt{w^2 + l^2 + h^2}} \right) + \frac{w}{\sqrt{w^2 + h^2}} \sin^{-1}\left( \frac{l}{\sqrt{w^2 + l^2 + h^2}} \right) \right)$$

where "l" is the half length of the rectangular aperture, "w" is the half width of the rectangular aperture, and "h" is the height of the aperture above the source. This equation and it's derivation can be found in H. Cotton's Principles of Illumination (John Wiley, New York, 1960, p. 157) and P. Moon's The Scientific Basis of Illuminating Engineering, 2nd Edition (Dover, New York, 1961, p. 267). In these texts, the authors actually derive the irradiance at a position due to a large rectangular Lambertian source; however, the mathematics is for this application is identical.

In order to derive the optimum height for an off axis rectangular aperture, one must first compute the portion of the flux subtended by a rectangular source whose half width is equal to the actual half width of the aperture plus the amount by which the aperture is decentered. Next one must compute the portion of the flux subtended by a rectangular source whose half width is equal to the amount by which the aperture is decentered minus the actual half width of the aperture. The result of this second calculation must be subtracted from the result of the first, and the answer divided by two. Repeating this procedure for various heights of the aperture enables one to numerically solve for the optimum height. For this particular configuration, the optimum height is approximately 2 inches, at which height a minimum of 28% of the emitted photons strike the PMT 8 directly without any intervening reflections.

Figure 10:
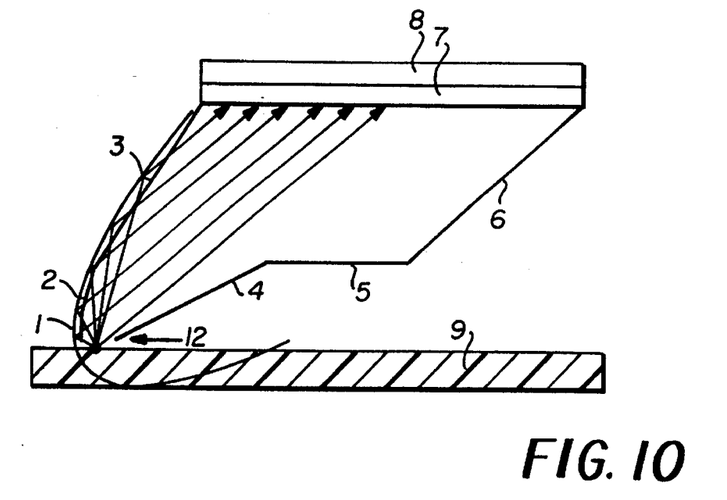
FIGS. 10–14 are cross-sectional diagrammatic views useful in explaining the present invention.

With regard to those photons that do not strike the PMT 8 directly; the size, location, and angular orientation of mirrors 1, 2, and 3 have been chosen such that emissions striking these mirrors will be directed to PMT 8 without requiring any additional reflections. This task can be accomplished by utilizing a single cylindrical reflector (Reference FIG. 10) whose cross section resembles a conic section (i.e., a parabola, an ellipse, a hyperbola, or a circle); however, these surfaces can be difficult, or at least costly to manufacture. The end result of utilizing conic section reflector can also be achieved by utilizing properly sized, located, and oriented planar reflective surfaces. The latter being much more economical to fabricate.

Figure 11:
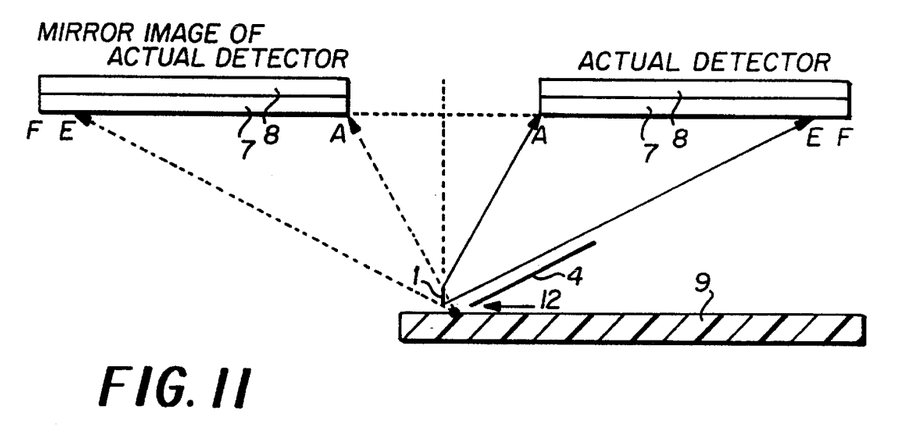

FIG. 11 is a cross section of the collector 100 which shows the relative size, location, and orientation of mirror 1. Mirror 1 is oriented parallel to the scan path and perpendicular to the phosphor 9. The bottom edge of mirror 1 is chosen to be the same height above the phosphor 9 as the bottom of mirror 4. In this particular embodiment, the lower height is $\frac{1}{16}$th of an inch, to accommodate warpage of the phosphor 9. The bottom edges of mirrors 1 and 4 form an aperture 12 of ¼ of an inch in width. This aperture 12 allows 89.4% of the photons emitted to enter the collector 100. Emissions directed at the bottom edge of mirror 4, enter the collector 100 and propagate along mirror 4 striking the edge of the absorption filter 7 at point F. This path is parallel to both mirror 4 and that path followed by emissions that strike the bottom edge of mirror 1 and are directed to point E at the absorption filter 7. The height of the top edge of mirror 1 is defined by the intersection of mirror 1 and the emission path that is directed to the edge A of the absorption filter 7's mirror image. If the top edge of mirror 1 were any higher, those photons intercepted by the extension of this surface could not reach the PMT 8 with a single reflection. For this particular embodiment, the height of mirror 1 above the phosphor 9 is approximately 0.22 inches.

Figure 12:
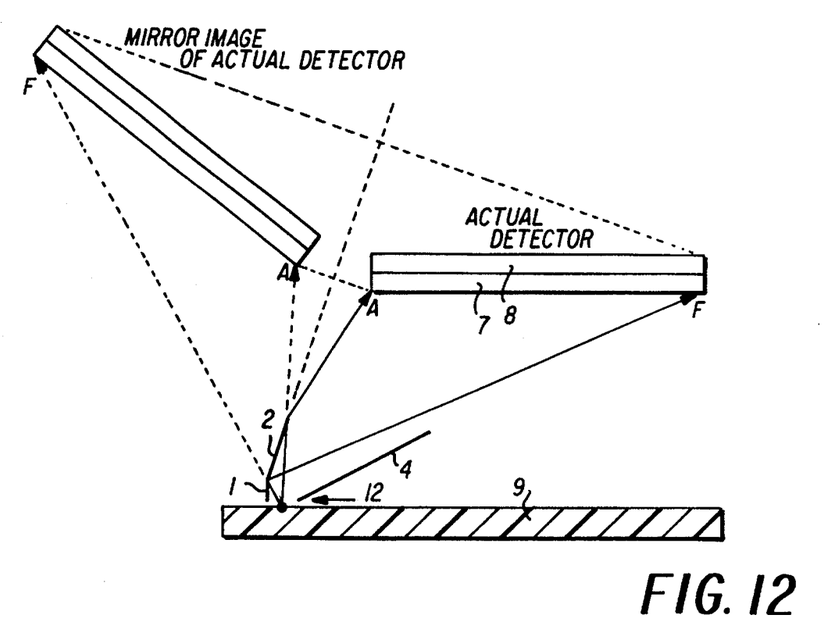

FIG. 12 is a cross section of the collector 100 which shows the relative size, location, and orientation of mirror 2. Mirror 2 is oriented parallel to the scan path. The bottom edge of mirror 2 is coincident with the top edge of mirror 1. The angular orientation of mirror 2 is adjusted such that photons striking the bottom edge of mirror 2 are directed to the edge F of the absorption filter 7. This occurs when the straight line extension of this emission path intersects the edge F of the absorption filter 7's mirror image. The height of the top edge of mirror 2 is defined by the intersection of mirror 2 and the emission path that is directed to the edge A of the absorption filter 7's mirror image. For this particular geometry, the height of mirror 2 above the phosphor 9 is approximately 0.71 inches. In addition, mirror 2 has been rotated approximately 18.8 degrees relative to mirror 1. With regard to the actual embodiment, the height of mirror 2 above the phosphor 9 was adjusted to approximately 0.57 inches, and the angular rotation was reduced to approximately 15.2 degrees. At first glance, this appears to be a major departure from the original design philosophy; however, the following explanation shows that not to be the case.

If mirror 2 were terminated at a height of 0.71 inches with a rotation angle of 18.8 degrees, it would extend into and slightly to the right of the scanning beam. When the mirror 2 is slotted, to allow the scanning beam to pass through the collector 100, mirror 2 would become two separate mirrors—a large mirror on the left side of the scanning beam and an extremely small one on the right side of the scan beam. Instead of constraining the rotation of this mirror so that photons striking the bottom edge of mirror 2 are directed toward edge F of the absorption filter 7, the rotation of this mirror 2 is constrained to direct photons striking the top edge of mirror 2, toward edge A of the absorption filter 7 (Reference FIG. 5). The top edge of mirror 2 is now being defined by its intersection with an imaginary plane declined 2.86 degrees to the left of phosphor 9's mirror normal and coincident with the scan line. Two imaginary planes, declined 2.86 degrees to the right and left of phosphor 9's mirror normal, and coincident with the scan line, define a triangular region in which 5.0% of all photons emitted from the phosphor 9 can escape through the upper slot 10. A 5.0% loss through slot 10 was established as a baseline in the design of this collector 100. Mirror 2, with it's original 18.8 degree rotation, could have been terminated on the left side of phosphor 9's mirror normal, at the intersection of mirror 2 and the imaginary plane—a height of 0.51 inches. The result would have been emissions striking mirror 2 would be reflected toward the right side of the PMT 8 at a higher angle of incidence. By deviating slightly from the general design philosophy, emissions striking this mirror are now reflected toward the left side of the PMT 8 (Locations A through D—Reference FIG. 5) at a lower angle of incidence, thereby decreasing the reflectance at the absorption filter 7. In addition, the upper entrance slot 10 is now 12% higher than it would have been above the phosphor 9, and it's width is increased by 12%—making alignment easier—with no increase in lost photons. This slight variation in the design philosophy was made possible because, for this particular geometry, emissions striking mirror 3 do not fill all of PMT 8 as will be seen below; therefore, there is room for some "give and take" between the relative sizes and angular orientations of mirrors 2 and 3. Because of the fact that an extension of mirror 2 does not intersect the PMT 8, a third mirror is required.

Figure 13:
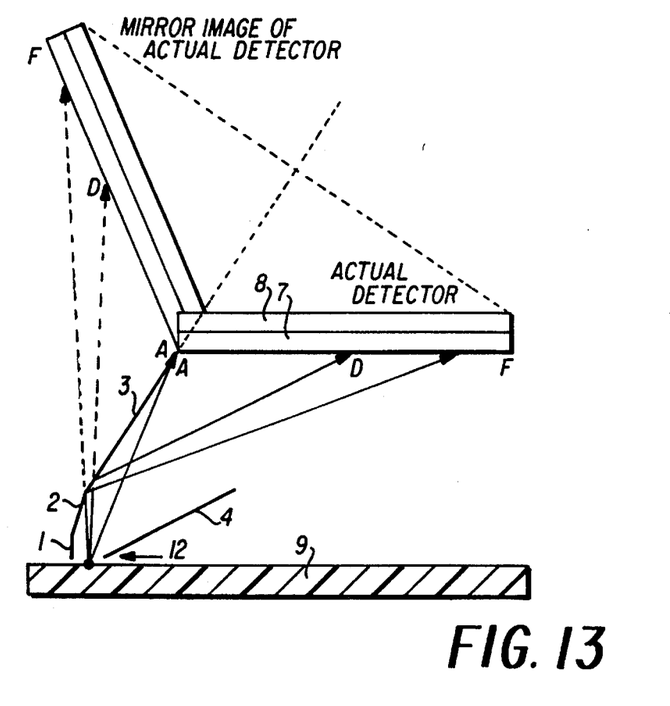

FIG. 13 is a cross section of the collector 100 which shows the relative size, location, and orientation of mirror 3. Mirror 3 is oriented parallel to the scan path. The bottom edge of mirror 3 is coincident with the top edge of mirror 2. Following the same design philosophy described above, the angular orientation of mirror 3 would be adjusted such that photons striking the bottom edge of mirror 3 are directed to the edge F of the absorption filter 7. Given this orientation, mirror 3 would intersect PMT 8 at a position other than location A, thereby obstructing a portion of the PMT 8. Hence, the angular orientation of mirror 3 is adjusted to intersect the PMT 8 at location A. In this angular orientation and location, mirror 3 is parallel and coincident with the path taken by photons that strike the top edge of mirror 2 on their way to location A of the PMT 8. For this particular embodiment, that rotation angle is approximately 33.3 degrees relative to mirror 1. This angular orientation redirects emissions that strike the bottom edge of mirror 3 away from location F to a new location about ⅓ of the way towards location D of absorption filter 7. This orientation of mirror 3 has the additional benefit of reducing the angle of incidence of the emissions upon the detector, thereby decreasing the reflectance at absorption filter 7.

In order to allow an opening for the scan beam to pass through the collector 100, the bottom edge of mirror 3 is trimmed away to coincide with the intersection of mirror 3 and the imaginary plane that is tilted 2.86 degrees to the right of phosphor 9's mirror normal that is coincident with the scan beam. The extension of mirror 3 still coincides with the top edge of mirror 2; however, the actual height of the bottom edge of mirror 3 is now approximately 0.67 inches for this particular embodiment. The height of the top edge of mirror 3 is defined by the height of absorption filter 7, which is approximately 1.75 inches above the phosphor 9.

By redirecting all intersecting emission paths toward PMT 8 with a single reflection, this clever sizing and arrangement of mirrors 1, 2, and 3 also prevents any photons from escaping through the upper slot 10, other than by direct emission path. Many collector designs in the prior art fail in this regard. In those designs, an image (s) of the upper slot is visible from the emission point, in the reflective mirrors; thereby providing additional emission paths out of the collector and lowering collection efficiency.

Figure 14:
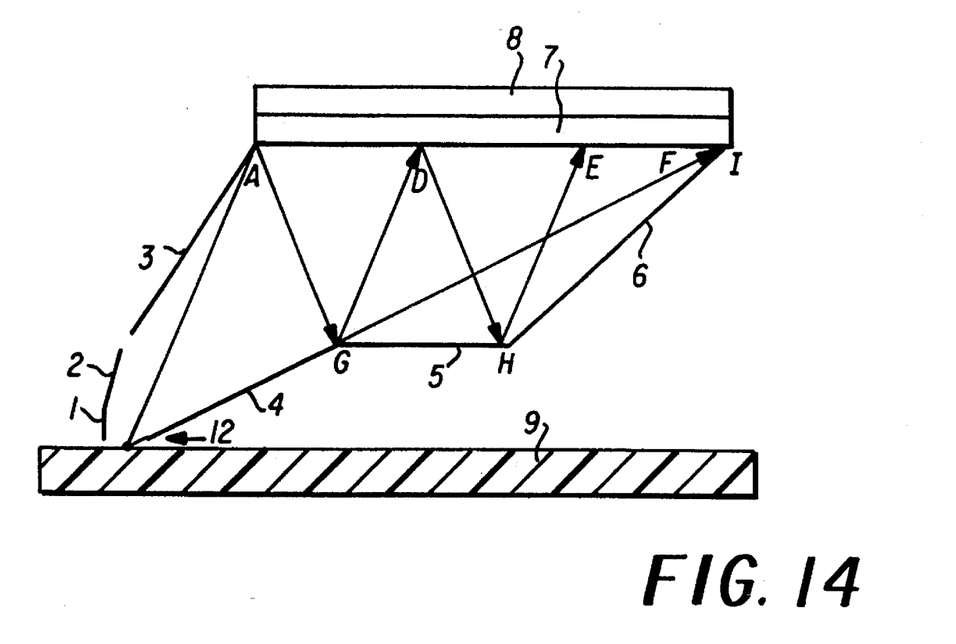

FIG. 14 is a cross section of the collector 100 which shows the relative size, location, and orientation of mirror 5. Mirror 5 is oriented parallel to PMT 8. The left edge, G, and it's height above the phosphor 9 is defined by the intersection of the reflection path (A to G) for photons that strike the PMT 8 directly at location A (any other emission path striking PMT 8, whether directly or indirectly, will reflect and strike mirror 5 to the right of location G), and the path followed by those photons that strike PMT 8 directly at location F. For this particular embodiment, mirror 5 is approximately 0.61 inches above phosphor 9, and it's left edge is located approximately 1.23 inches to the right of the scan beam. The combination of mirror 5 with PMT 8 form a channel in which the photons, which must enter from the lower left, will enter and reflect back and forth along a path similar to that illustrated in FIG. 14 (A-G-D-H-E) as the energy propagates down the channel. Mirror 5 thus returns that energy reflected by the PMT 8 back to PMT 8 with a single reflection. Because of the finite extent of the detector 100, the length of this channel must be terminated with another mirror—mirror 6.

Referring back to FIG. 6, there exists a ray path leading from the emission point, to mirror 3, on to absorption filter 7 at location B, on to mirror 5 at location H, and finally reflecting and striking the absorption filter 7 at it's right most edge—location F. The angular orientation of mirror 6 is such that it intersects/terminates mirror 5 precisely where this ray path intersects mirror 5. Thus mirror 6 is parallel and coincident with this ray path. We are most concerned with mirror 3 ray paths because these ray paths have the largest angle of incidence (reflectance) at mirror 5. If mirror 5 extended any further to the right of this location H, mirror 3 ray paths that strike mirror 5 to the right of location H would strike mirror 6 prior to striking the PMT 8 thus requiring 2 reflections to return to the PMT 8. Mirror 3 ray paths that would normally strike mirror 5 to the right of location H now strike mirror 6 and are returned back to PMT 8 with a single reflection. In this particular embodiment, the right most extent of mirror 5 is approximately 2.24 inches from the scan beam 11. This intersection point requires mirror 6 to be rotated approximately 42 degrees relative to mirror 1.

ADVANTAGES

The advantages of this collector design are exceptionally high collection efficiency, near uniform collection efficiency signature, exceptionally low flare radiation, and low manufacturing costs due to the utilization of planar reflectors. With regard to specularly reflective collectors, the collection efficiency has been very nearly optimized. Any further significant improvement in collection efficiency would probably require the utilization of larger mirror area detectors or utilization of additional detectors, so as to increase the amount of emitted radiation that can be detected prior to undergoing any reflections. In addition, the signal-to-noise ratio of the system is optimized by specularly reflecting as much emitted light as possible and directing it to the PMT assembly. The collector combines unique material selection/construction method with coating technology.

The invention has been described in detail herein with reference to the figures, however, it will be appreciated that variations and modifications are possible within the spirit and scope of the invention. For example, the invention can be used in other imaging systems in which an information medium is scanned with a radiation beam to produce an information image which is reflected from or transmitted through the information medium. Where the information image is transmitted, the slot between mirrors 2 and 3 may be omitted.

What is claimed is:

1. A collector for collecting and detecting radiation emitted by, reflected from, or transmitted through a scanned information medium comprising:
   a photodetector assembly with first and second sides which extends the width of a scanned information medium and which has a detection surface substantially parallel to or perpendicular to said information medium;
   a first planar mirror assembly which extends parallel to said photodetector assembly, which has a lower edge located adjacent to said information medium and an upper region adjacent to said first side of said detection surface of said photodetector assembly;
   a second planar mirror assembly which extends parallel to said photodetector assembly, which has a lower edge located adjacent to said information medium and an upper region adjacent to said second side of said detection surface of said photodetector assembly;
   wherein said lower edges of said first and said second planar mirror assemblies are spaced apart and form an aperture for passing radiation emitted by, reflected from, or transmitted through an information medium;
   wherein said photodetector assembly, said first planar mirror assembly and said second planar mirror assembly are configured (1) so that substantially all radiation passing through said aperture strikes said photodetector assembly either directly or after a single reflection from said first planar mirror assembly; (2) so that said first planar mirror assembly reflects incident radiation only once before it strikes said photodetector assembly; and so that said second planar mirror assembly reflects radiation reflected by said photodetector assembly with only a single reflection back to said photodetector assembly; and wherein said first and second planar mirror assemblies include specularly reflective mirrors including an acrylic substrate having a high reflectance coating which is vacuum deposited on said acrylic substrate.

2. The collector of claim 1 wherein said photodetector assembly includes a contiguous array of photomultiplier tubes.

3. The collector of claim 1 wherein said first planar mirror assembly includes first, second and third specularly reflective planar mirrors extending parallel to a scanning beam of radiation, wherein each of said first, second and third specularly reflective planar mirrors include an acrylic substrate having a high reflectance coating which is vacuum deposited on said acrylic substrate.

4. The collector of claim 3 wherein said first specularly reflective planar mirror of said first planar mirror assembly is oriented perpendicularly to a scanned information medium.

5. The collector of claim 1 wherein said second planar mirror assembly includes fourth and fifth specularly reflective planar mirrors extending parallel to a scanning beam of radiation, wherein each of said fourth and fifth specularly reflective planar mirrors include an acrylic substrate having a high reflectance coating which is vacuum deposited on said acrylic substrate.

6. The collector of claim 5 wherein said fourth specularly reflective planar mirror of said second planar mirror assembly is oriented in parallel to said photodetector assembly.

7. The collector of claim 1 including planar mirrors at either end of said collector located between said first and said second planar mirror assemblies.

* * * * *